United States Patent [19]

Ford

[11] Patent Number: 5,309,819
[45] Date of Patent: May 10, 1994

[54] DUAL MOTOR DRIVE AUTOMATIC BEVERAGE BREWING APPARATUS

[75] Inventor: David F. Ford, Springfield, Ill.

[73] Assignee: Bunn-o-Matic Corporation, Springfield, Ill.

[21] Appl. No.: 74,387

[22] Filed: Jun. 10, 1993

[51] Int. Cl.⁵ .............................................. A47J 31/00
[52] U.S. Cl. ................................... 99/28; 99/289 R; 99/300
[58] Field of Search ................. 99/279, 280–283, 99/287, 289 R, 290, 295, 299, 300, 304, 305, 307; 426/433

[56] References Cited

U.S. PATENT DOCUMENTS 4,703,686 11/1987 Siegfried ............................ 99/279
5,134,925 8/1992 Bunn et al. ...................... 99/289 R

*Primary Examiner*—Robert W. Jenkins
*Attorney, Agent, or Firm*—Trexler, Bushnell, Giangiorgi & Blackstone, Ltd.

[57] ABSTRACT

A multiple orientation drive device for use with a beverage brewing apparatus. The beverage brewing apparatus is a type having a brew chamber which includes a top and bottom assembly and an elongated brewing component extending into the brew chamber. The elongated brewing component is associated with the drive device such that it is linearly and rotatably shiftable in the brew chamber. The linear and rotatable shifting are independently achieved by the actions of an independent linear drive assembly and an independent rotary drive assembly. The linear drive assembly is associated with the brewing component for linearly driving the brewing component in the brew chamber and the rotary drive assembly is associated with the brewing component for rotating the component independently of the linear drive assembly. The present invention also includes synchronizing the linear drive assembly and rotary drive assembly to simultaneously linearly shift and rotatably shift the brewing component in the brew chamber. A sensor assembly is associated with the drive device to indicate the position of the brewing component in the brew chamber. The sensor assembly is coupled to a control device which in turn is attached to the linear and rotary drive assemblies. The control device selectively energizes and deenergizes the linear and rotary drive assemblies in response to predetermined conditions defined by the control signal from the sensor assembly.

14 Claims, 2 Drawing Sheets

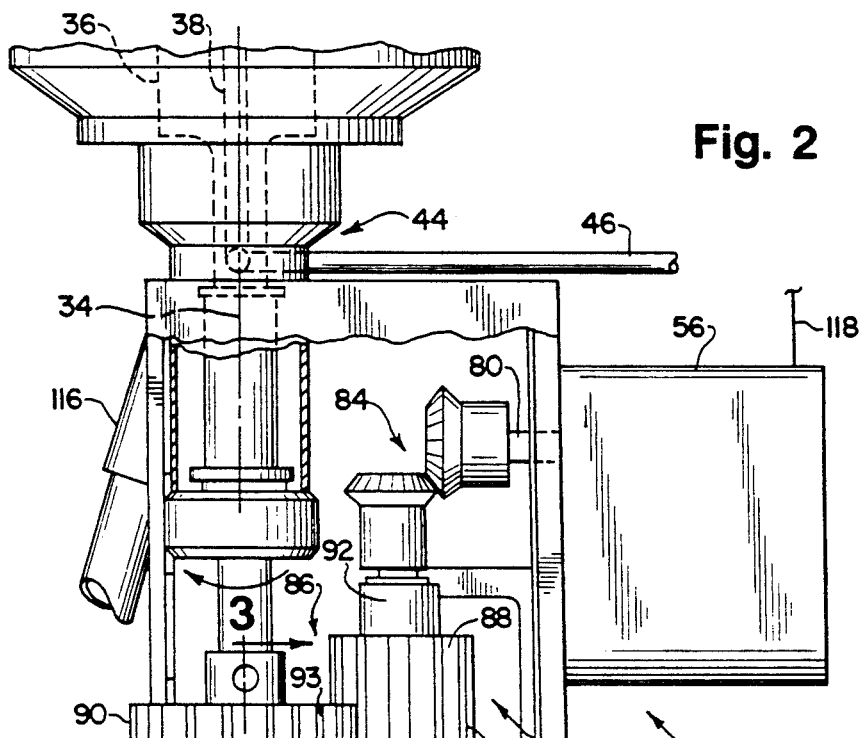
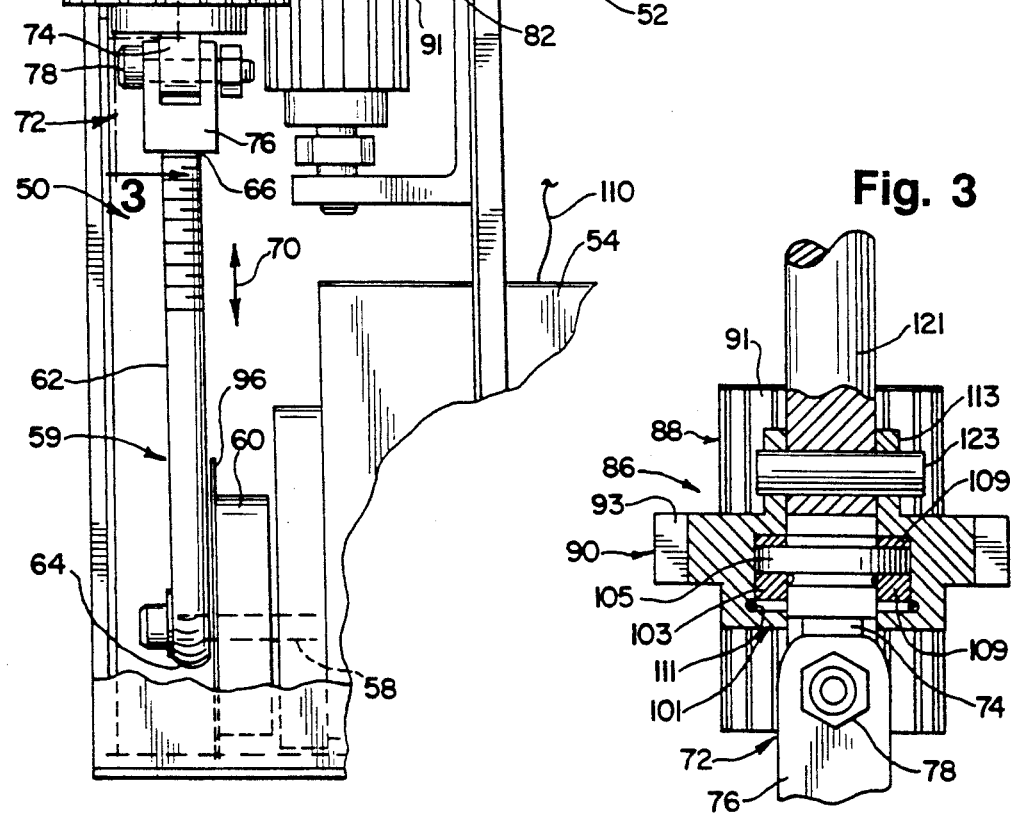

ns,819

DUAL MOTOR DRIVE AUTOMATIC BEVERAGE BREWING APPARATUS

BACKGROUND OF THE INVENTION

The present invention relates to drive devices for use with a beverage brewing apparatus. More specifically, the present invention envisions a multiple orientation drive device for use in driving a brewing component in a brew chamber of the beverage brewing apparatus.

A number of brewing devices are available which produce a brewed beverage using a substantially automated process. An example of an automatic beverage brewing apparatus is shown in U.S. Pat. No. 5,134,925 to Bunn et al. issued Aug. 4, 1992, incorporated herein by reference. A beverage brewing device as shown in Bunn et al. has a brew chamber which receives a charge of beverage brewing substance and infuses this substance with water to produce a brewed beverage therefrom. The brewed beverage is drained from the brew chamber and dispensed into an appropriate container. The brew chamber has a top assembly and a bottom assembly through which are formed a throat and a drain, respectively. A brewing component or piston extends into the brew chamber selectively shifting through the throat and the drain during a brewing cycle. The brewing component or piston is operated by a drive device attached thereto.

During a brew cycle, the piston is axially shifted downwardly by the drive device to receive a charge of brewing substance. The piston then shifts axially upwardly to close the throat and drain whereupon a quantity of water is dispensed to infuse the brewing substance and produce a brewed beverage. The brewed beverage is drained out of the brew chamber and dispensed into a collection container. Next, the piston is shifted upwardly to disengage a lower portion of the piston from the drain thereby draining the spent beverage brewing substance and any waste water out of the brew chamber. As shown in Bunn et al., the piston includes a flush water bore which extends therethrough to dispense water from a central area of the brew chamber. The piston is axially rotated and linearly shifted through the throat and drain to flush the inside surface of the brew chamber.

The drive device used in Bunn et al. employs a single drive assembly for both rotating and axially shifting the piston. A sensor is mounted in position relative to one of the rotating gears of the drive assembly to detect the movement of magnets mounted in the selected gear. Linear shifting is achieved by a threaded portion of the piston shaft being driven through a fixed, cooperatively threaded nut body. While the integrated rotary and linear drive device as shown in Bunn et al. is effective at driving the piston, there are applications where it is desirable to rotate the piston without linearly shifting it through the brew chamber and also linearly shifting the piston without rotating it in the chamber. As such, the device as shown in Bunn et al. cannot independently rotate nor linearly shift the piston.

OBJECTS AND SUMMARY OF THE INVENTION

A general object of the present invention is to provide a multiple orientation driving device which independently linearly shifts and independently rotates a brewing component through a brew chamber of a beverage brewing apparatus.

Another object of the present invention is to provide a drive device which independently linearly shifts and rotates a brewing component and also controllably synchronizes the linear and rotary driving action to simultaneously linearly shift and rotate the brewing component.

Yet another object of the present invention is to provide a sensor which is operatively associated with a linear drive assembly of the drive device of the present invention to sense the axial position of the brewing component in the brew chamber.

Briefly, and in accordance with the foregoing, the present invention envisions a multiple orientation drive device for use with a beverage brewing apparatus. The beverage brewing apparatus is a type having a brew chamber which includes a top and bottom assembly and an elongated brewing component extending into the brew chamber. The elongated brewing component is associated with the drive device such that it is linearly and rotatably shiftable in the brew chamber. The linear and rotary shifting are independently achieved by the actions of an independent linear drive assembly and an independent rotary drive assembly acting on the brewing component. The linear drive assembly is associated with the brewing component for linearly driving the brewing component in the brew chamber and the rotary drive assembly is associated with the brewing component for rotating the component independently of the linear drive assembly. The present invention also includes synchronizing the linear drive assembly and rotary drive assembly to simultaneously linearly shift and rotatably shift the brewing component in the brew chamber. A sensor assembly is associated with the drive device to indicate the position of the brewing component in the brew chamber. The sensor assembly is coupled to a control device which in turn is attached to the linear and rotary drive assemblies. The control device selectively energizes and deenergizes the linear and rotary drive assemblies in response to predetermined conditions defined by the control signal from the sensor assembly.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 2 is an enlarged diagrammatic, partial fragmentary, side elevational view providing greater detail of the structure and function of the multiple orientation drive device of the present invention; and FIG. 3 is an enlarged, partial fragmentary, cross-sectional view of a rotary linkage assembly operatively connecting first and second drive assemblies of the multiple orientation drive device.

DETAILED DESCRIPTION OF THE PREFERRED EMBODIMENT

Figure 1:
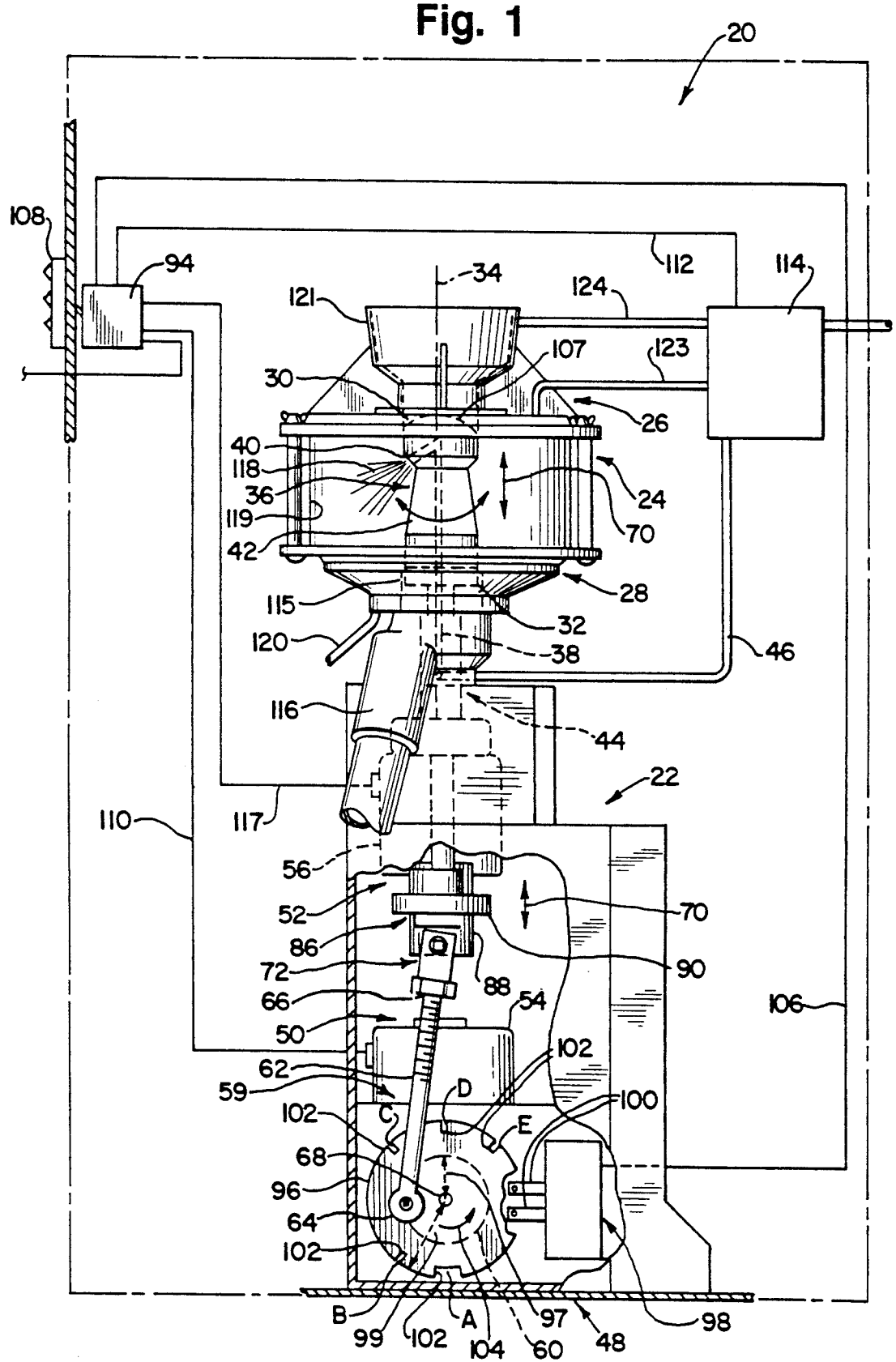
FIG. 1 is diagrammatic, partial fragmentary, cross-sectional side elevational view of a multiple orientation drive device of the present invention in use with a beverage brewing apparatus.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIGS. 1 and 2, a beverage brewing apparatus 20 is shown using a drive device 22 of the present invention. The brewing apparatus 20 includes a brew chamber 24 having a top assembly 26 and a bottom assembly 28. The top assembly 26 has a throat 30 extending therethrough and the bottom assembly 28 has a drain 32 extending therethrough. The throat 30 and drain 32 are generally aligned and define a central axis 34 extending through the brew chamber 24.

A brewing component 36 is positioned in the brew chamber 24 for rotary and linear shifting relative to the central axis 34 and through the throat and drain 30, 32. As shown in FIG. 1, a water line 38 extends through the brewing component 36 with a port 40 formed through the surface 42 of the brewing component 36. The water line 38 is attached to a rotary coupling 44 which receives water from a feed line 46. Water is delivered through the feed line 46 to the rotary coupling 44 and the water line 38 to be dispensed through the port 40 thus providing water to the inside of the brew chamber 24.

As shown in the illustration of FIG. 1, the brewing component 36 is an axially shiftable and rotatable piston which dispenses water to an inside surface of the brew chamber 24. While a piston 36 is shown in the present invention, it should be clear that other forms of a brewing component 36 which is axially shiftable and rotatable through the brew chamber 24 could be devised. In this regard, the multiple orientation drive device 22 of the present invention would be applicable to such a brewing component 36. Furthermore, a sensor assembly 48 as used in the drive device 22 of the present invention would also be applicable to sense the position of the brewing component 36 relative to the brew chamber 24.

With further reference to FIGS. 1 and 2, the drive device 22 includes a first drive assembly 50 and a second drive assembly 52. The first drive assembly 50 shifts the piston 36 generally linearly coaxial with the central axis 34. The second drive assembly 52 acts on the piston 36 to rotate the piston 36 about the central axis 34. As shown in FIG. 2, the first drive assembly 50 includes a first drive motor 54 and the second drive assembly includes a second drive motor 56. The first and second drive assemblies 50, 52 and first and second drive motors 54, 56 operate independently from each other. This is important since the first drive assembly 50 can shift the piston 36 without rotating the piston 36. Similarly, the second drive assembly 52 can rotate the piston 36 without axial movement.

Turning to the first drive assembly 50, the first motor 54 has an output shaft 58 driven by the motor 54. An eccentric mechanism 59 is attached to the output shaft 58 and driven by the drive motor 54. The eccentric mechanism 59 includes a drive hub 60 attached to the output shaft 58 and a connecting shaft 62 attached to the drive hub 60 at a first end 64 and to the piston 36 at a second end 66. With further reference to FIG. 1, the drive hub 60 (as shown in phantom line) has a center of rotation 68. The first end 64 is attached to the hub 60 at a position radially spaced away from a center of rotation 68 of the drive hub 60. As such, the first end 64 of the connecting shaft 62 rotates in a circular pattern about the center 68 of the hub 60. Rotation of the hub 60 by the first drive motor 54 creates a movement in a first orientation (as indicated by arrow 70) which follows an eccentric drive path at the first end 64.

The connecting shaft 62 moves both side to side and up and down. A pivot linkage 72 connecting the piston 36 to the connecting shaft 62 acts as a joint to allow the second end 66 to swing relative to the piston 36. The pivot linkage 72 directs the vertical component of the linkage 64 movement 70 to linearly shift the piston 36, attached thereto, through the brew chamber 24. The pivot linkage 72 includes a shoulder component 74 extending from the piston 36 and a pivot yoke 76 which mates with the shoulder 74. A joining pin 78 connects the pivot yoke 76 to the shoulder 74 and provides a point of rotation about which the connecting shaft 62 is permitted to swing relative to the piston 36.

Turning now to the second drive assembly 52, the second drive motor 56 is similar to the first drive motor 54 in that it also includes an output shaft 80 which drives another component, in this case, gear means 82 connecting the second drive motor 56 to the piston 36. The gear means 82 include a family of transitional gears to provide a desired rotary relationship between the drive motor 56 and the piston 36. More specifically, the gear means 82 include a pair of bevel gears 84 used to directionally translate the action of the drive motor 56 to a pair of spur gears 86. The pair of spur gears 86 include a drive gear 88 and an operating gear 90 with meshing teeth 91, 93. The drive gear 88 is elongated along a gear axis 92, which is parallel to the central axis 34 so that when the first drive assembly 50 axially shifts the piston 36, the operating gear 90 translates along the gear axis 92 while maintaining the teeth 91, 93 in cooperatively meshed contact.

As shown in the enlarged partial fragmentary cross-sectional view of FIG. 3, a rotary linkage assembly 101 operatively interconnects the gear means 82 of the second drive assembly 52 with the connecting shaft 62 of the first drive means 50. The rotary linkage assembly 101 includes a cavity 103 formed inside the operating gear 90 and a link pilot 105 which matably inserts into the cavity 103. The link pilot 105 is a disk-shaped member which is sized and dimensioned to allow the operating gear 90 to rotate thereabout when driven by the drive gear 88. A pair of thrust washers 109 are positioned in the cavity 103 on each side of the link pilot 105 to retain it in position in the cavity 103. A snap ring 111 is positioned at an open end of the cavity 103 to retain the thrust washers 109 and the link pilot 105 in the cavity 103. A hub 113 extends from the top of the operating gear 90 to engage a lower end 121 of the piston shaft by means of a clevis pin 123 extending through the shaft 121 and the hub 113.

The combination of the rotary linkage assembly 101 and the pivot linkage 72 act as a universal joint to interconnect the first and second drive means 50, 52 to provide both rotary and linear motion in the piston 36. The pivot linkage 72 allows the connecting shaft 62 to pivot about the joining pin 78 as it is driven in an eccentric motion by the first drive assembly 50. The rotary linkage assembly 101 is connected to the pivot linkage 72 by the joining pin 78 such that linear motion transferred along the connecting shaft 62 is transferred through the link pilot 105 to the lower end of the shaft 121. Additionally, when the operating gear 90 is driven by the drive gear 88, the operating gear 90 rotates about the link pivot 105 to rotate the shaft 121 which is connected to the hub 113 by the clevis pin 23.

The first and second drive assemblies 50, 52 are designed so that one revolution of the drive hub 60 equals a full axial displacement of cycle of the piston 36. Further, the operating gear 90 and drive gear 88 are configured to allow the operating gear teeth 90 to slide along the drive gear teeth 93 while the piston 36 is being axially displaced. Since the piston 36 is retained in the brew chamber 24 and is only allowed to move coaxial with respect to the central axis 34 (the piston 36 is not allowed to move at an angle relative to the central axis 34) the spur gears 86 will operate to rotate the piston 36 while the piston 36 is axially displaced along the central axis 34.

The drive device 22 includes the sensor assembly 48 and control means 94 to sense a linear position of the piston 36 in the brew chamber 24 and to selectably energize and deenergize the first and second drive assemblies 50, 52 in response to sensed position. The sensor assembly 48 includes a sensor plate 96 which is attached to the drive hub 60. As can be seen in FIG. 1, a radius 97 of the sensor plate 96 is greater than a radial dimension 99 of the hub 60. The sensor assembly 48 also includes a detector 98 which is positioned with a pair of detector devices 100. The sensor plate 96 includes multiple position indicators 102 circumferentially spaced apart around the sensor plate. The locations of the position indicators 102 on the sensor plate 96 corresponds to a predetermined position of the piston 36.

The detectors 100 are positioned in close relation to sensor plate 96 to detect alignment of the indicators 102 as the plate 96 is rotated with the hub 60. As shown, the sensor detects when a corresponding one of the indicators 102 (shown in the illustrations as slots) is aligned with the head of the detector 100. As shown, two detectors 100 are provided to detect the movement of the slots 102.

The sensor plate 96 rotates in a counterclockwise direction (as indicated by arrow 104). The slots 102 formed in the perimeter of the sensor plate 96 are lettered A through E for descriptive purposes. When the plate 96 is rotated so that slot A is positioned over both detectors 100, the detector 98 will sense a "home" position and produce a control signal transmitted along line 106 to the control means 94. In the "home" position, the piston 36 will be positioned in the brew chamber 24 with the top 107 of the piston 36 disengaged from the throat 30. In this position, the brewing apparatus 20 is prepared to receive a beverage brewing substance into the brew chamber 24 through the throat 30. Once the control means 94 are activated by a user at a control panel 108, a brew cycle is initiated which utilizes control signals from the sensor assembly 48 to operate other components in the beverage brewing apparatus 20. Upon initiating the brew cycle, the first drive motor 54 is activated by the control means 94 over control line 110 to rotate the hub 60 thereby moving the piston 36 from the open throat position slightly upwardly along the central axis 34 to begin to close the throat 30.

When the sensor 98 senses alignment of slot B with the detectors 100, a signal is transmitted along line 106 to the control means 94 which in turn transmits a signal over line 112 to a water distribution system 114 to provide prefill water to the chamber 24. When slot B is aligned with the detectors 100, the piston is also rotated to rinse the brewing substance from the piston and the inside of the brewing chamber toward the bottom assembly 28.

The first drive means will once again be operated after a desired period of time to drive the piston upwardly from the slot B position to the slot C position thereby sealing the throat 30 and the drain 32 to provide a sealed brewing chamber while the brewing substance is infused with heated water from the water distribution system 114. The piston 36 is maintained in the slot C position for a desired period of time, maintaining a seal between the throat 30 and the drain 32, before being moved to the slot D position. Once slot D is aligned with the detectors 100, the piston 36 will be in the raised position such that the bottom portion of the piston will be disengaged from the drain 32. As such, the upper portion of the piston moves through the throat 30 to provide the necessary vertical displacement. The slot D position defines a flush period during which the lower portion 115 of the piston 36 is disengaged from the drain 32 thus allowing the brewing substance and fluid retained therein to drain through the drain 32 and out through the drain line 116. During this flush period, the second drive assembly 52 is activated to rotate the piston 36 and to dispense a spray 118 of water from the port 40 of the piston to rinse an inside surface 119 of the brew chamber 24. The rotary action of the spray 118 creates a flushing swirling action in the brew chamber to further rinse spent brewing substance from the lower assembly 28 which includes a filter surface (not shown).

The piston is moved downwardly until slot E is aligned with the detectors 100 at which point rotation of the piston is continued as well as flushing spray water 118 through the port 40 from the piston to further rinse the inside surface 119 of the brew chamber 24. The flush water primarily consists of water and fine particulate matter in this position, which waste water and small particulate slurry is allowed to flush through the drain 32 into the drain line 116. The flushing continued until a predetermined time and then ceased. After a desired period of time which allows substantially all of the remaining fluid to drain through the drain 32, the first drive assembly 50 is operated to move the piston downwardly into the A slot position thereby preparing the brew chamber 24 to receive another quantity of brewing substance through the throat 30 which is now opened.

As such, it should be clear that each position on the sensor disk defines a position at which linear movement (70) of the piston 36 is stopped. Additionally, upon aligning slot, B, D or E with the detectors, the piston is rotated by the second drive assembly 52. The first drive assembly 50 quickly and efficiently moves the piston in the vertical or linear direction while the second drive assembly quickly and efficiently moves the piston in a rotary direction.

In the home position the piston is downwardly displaced and the top of the piston 107 is disengaged from the throat 30 to accept a charge of brewing substance into the brew chamber 24. When the piston is moved to the B position, the piston is upwardly displaced and water is introduced through the top assembly 26 and through a funnel portion 121 by the water distribution system 114 through lines 123, 124, respectively. The quantity of water dispensed allows the brew chamber to be prefilled and to rinse brewing substance from the piston and into the brew chamber.

At a desired time, the piston is moved into the slot C position whereupon both the throat and drain 30, 32 are sealed by the piston which has been moved upwardly to provide a steeping and brewing period. During the steeping and brewing period, water is introduced through the top portion 26 to infuse the brewing substance and extract a brewed beverage to be dispensed through the dispensing line 120.

At a desired time, the piston is moved into the slot D position to disengage the piston from the drain 32 and allow spent brewing substance to drain through the drain 32 and into the drain line 116. In the slot D position, the piston is also rotated and water is sprayed therefrom to flush spent brewing substance and waste water from the brew chamber. After a desired period of time, the piston is moved into the slot E position and flushing is continued with the piston rotating to further rinse brewing by-products from the brew chamber. The piston is then moved into the slot A position whereby it is ready for another brewing cycle.

During the linear and rotary movement of the piston, the control means 94 operates the first and second drive assemblies 50, 52 for desired periods of time. The desired time periods are adjustable at the control mean 94 to provide, for example, desired brewing or brew chamber cleaning results. The control means 94 includes a timing circuit which is controllable to provide control time periods for each one of the slots or piston positions indicated on the sensor plate 96. For example, the control means 94 is programmable to provide longer or shorter flushing times, brew/steep times, as well as rotation times. As such, the control means 94 is operatively connected or coupled with the sensor assembly 48 and the first and second drive means 50, 52 to selectively energize and deenergize the drive assemblies 50, 52 in response to conditions defined by the control means 94 and signals from the sensor assembly 59.

While a preferred embodiment of the present invention is shown and described, it is envisioned that those skilled in the art may devise various modifications of the present invention without departing from the spirit and scope of the appended claims. The invention is not intended to be limited by the foregoing disclosure.

I claim:

1. A beverage brewing apparatus of the type having a brew chamber with a brewing component being shiftable relative to said brew chamber, drive means being operatively associated with said brewing component for controllably moving said brewing component in at least two orientations, said drive means comprising:
    a first driving assembly of said drive means shifting said brewing component in a first orientation relative to said brew chamber;
    a second driving assembly of said drive means being selectively operable and driving said brewing component independent of said first driving assembly for shifting said brewing component in a second orientation relative to said brew chamber.

2. A beverage brewing apparatus as recited in claim 1, further comprising:
    said first drive assembly of said drive means shifting said brewing component in a direction defining a linear path in said brew chamber; and
    said second drive assembly of said drive means rotating said brewing component in said brew chamber about said linear path, independent of said first drive assembly.

3. A beverage brewing apparatus as recited in claim 2, further comprising:
    said first and second drive assemblies being synchronized for simultaneously driving said brewing component in said brew chamber to simultaneously displace and rotate said brewing component.

4. A beverage brewing apparatus of the type having a brew chamber with a brewing component being shiftable relative to said brew chamber, drive means being operatively associated with said brewing component for controllably moving said brewing component in at least two orientations, said drive means comprising:
    a first driving assembly of said drive means shifting said brewing component in a first orientation relative to said brew chamber;
    a second driving assembly of said drive means, being selectively operable to drive said brewing component independent of said first driving assembly, for shifting said brewing component in a second orientation relative to said brew chamber;
    a sensor assembly being operatively associated with said drive means for sensing the position of said brewing component relative to said brew chamber and producing a control signal indicating the position of said brewing component; and
    control means being coupled to said sensor assembly and to said first and second driving assemblies for selectively energizing and deenergizing said first and second driving assemblies in response to predetermined conditions being defined by said control signal.

5. A beverage brewing apparatus of the type having a brew chamber with a brewing component being shiftable relative to said brew chamber, drive means being operatively associated with said brewing component for controllably moving said brewing component in at least two orientations, said drive means comprising:
    a first driving assembly of said drive means shifting said brewing component in a first orientation relative to said brew chamber, said first driving assembly of said drive means shifting said brewing component in a direction defining a linear path in said brew chamber;
    a second driving assembly of said drive means, being selectively operable to drive said brewing component independent of said first driving assembly, for shifting said brewing component in a second orientation relative to said brew chamber, said second driving assembly of said drive means, rotating said brewing component in said brew chamber about said linear path, independent of said first driving assembly;
    said linear path of said brewing component defining a central axis extending through said brew chamber;
    said first driving assembly including a first drive motor and a linkage operatively associated with said first drive motor, said first drive motor operating said linkage to act on said piston to shift said piston along said central axis; and
    said second driving assembly including a second drive motor and gear means operatively associated with said second drive motor and said piston, said second drive motor operating said gear means to rotate said piston about said central axis.

6. A multiple orientation drive device for use with a beverage brewing apparatus of the type having a brew chamber including top and bottom assemblies and an elongated piston being linearly and rotatably shiftable relative to said top and bottom assemblies, said piston having a direction of elongation defining a central axis, said multiple orientation drive device comprising:

a linear drive assembly of said multiple orientation drive device being operatively associated with said piston for linearly driving said piston generally coaxial with said central axis; and a rotary drive assembly of said drive device independent of said linear drive assembly being operatively associated with a selectively operable relative to said piston for rotating said piston along said central axis independently of said linear drive assembly.

7. A multiple orientation drive device as recited in claim 6, further comprising:

said linear and rotary drive assemblies being synchronized for independently, synchronously driving said piston relative to said central axis for simultaneously linearly shifting and rotating said piston in said brew chamber along said central axis.

8. A multiple orientation drive device as recited in claim 6, further comprising:

a sensor means being operatively associated with said linear drive assembly for sensing a linear position of said piston in said brew chamber, said sensor means producing a control signal indicating the position of said piston along said central axis; and control means coupled to said sensor means and said linear and rotary drive assemblies for receiving said control signal generated by said sensor means and selectively energizing and deenergizing said linear and rotary drive assemblies.

9. A multiple orientation drive device as recited in claim 8, further comprising:

said piston being operatively retained in said brew chamber for linear shifting coaxial with said central axis through said brew chamber;

a drive hub being rotatably attached to and rotated by said first drive motor, said drive hub having a center of rotation;

a connecting shaft having a first end and a second end, said first end being operatively attached to said drive hub a radial distance from said center of rotation, said second end being operatively attached to said piston, rotation of said drive hub driving said piston through said brew chamber;

a sensor plate of said sensor means being operatively associated with said drive hub, said sensor plate having a radial dimension which is greater than a radial dimension of said drive hub;

at least one position indicator on said sensor plate corresponding to a predetermined position of said piston relative to said brew chamber; and a detector being coupled to said control means and being operatively associated with said sensor plate for detecting at least one of said position indicators, said detector producing a control signal upon detecting one of said position indicators for indicating the position of said piston.

10. A multiple orientation drive device as recited in claim 6, further comprising:

said linear drive assembly including a first drive motor and a linkage operatively associated with said first drive motor, said first drive motor operating said linkage for acting on said piston to linearly shift said piston coaxial with said central axis; and said rotary drive assembly including a second drive motor, independent of said first drive motor, and gear means operatively associated with said second drive motor and said piston, said second drive motor operating said gear for acting on said piston to rotate said piston about said central axis.

11. A beverage brewing apparatus comprising:

a brew chamber assembly having a top assembly and a bottom assembly, said top assembly having a throat extending therethrough, and said bottom assembly having a drain extending therethrough, said throat and drain being generally axially aligned and defining a central axis extending therethrough;

a piston being axially and rotatably shiftable through said throat and said drain;

a linear drive assembly being operatively associated with said piston for controllably linearly shifting said piston along said central axis through said drain and throat;

a rotary drive assembly being operatively associated with said piston, independent of said linear drive assembly, for controllably rotatably shifting said piston about said central axis;

a sensor being operatively associated with at least one of said linear and rotary drive means for sensing positions of said piston relative to said brew chamber assembly and producing a control signal indicating a corresponding position of said piston relative to said brew chamber; and control means coupled to said sensor and to said linear and rotary drive assemblies for selectively energizing and deenergizing said linear and rotary drive assemblies in response to predetermined conditions corresponding to said control signal.

12. A beverage brewing apparatus as recited in claim 11, further comprising:

said linear drive assembly including an eccentric mechanism having a first drive motor, a hub of said eccentric assembly being attached to said motor, and a connecting shaft of said eccentric assembly having a first end being attached to said hub and a second end being attached to said piston, rotary motion of said hub driving said connecting shaft to linearly act on said piston;

a sensor plate operatively associated with said eccentric mechanism, said eccentric mechanism rotating said sensor plate;

a plurality of position indicators being spaced apart on said sensor plate corresponding to a predetermined position of said piston; and a detector being coupled to said control means and being operatively associated with said sensor plate for detecting said position indicators, said detector producing a control signal indicating a corresponding relative position of said piston.

13. A beverage brewing apparatus as recited in claim 11, said linear drive assembly further comprising:

a first drive motor;

a drive hub being attached to and rotated by said first drive motor, said drive hub having a center of rotation; and a linkage having a first end and a second end, said first end being operatively attached to said drive hub a radial distance from said center of rotation, said second end being operatively attached to said piston, rotation of said drive hub by said first drive motor producing an eccentric motion for acting on said piston to linearly shifting said piston along said central axis through said brew chamber.

14. A beverage brewing apparatus as recited in claim 13, said linear drive assembly further comprising:

a first pivot member on said second end of said connecting shaft cooperatively engaging a second pivot member on a corresponding end of said piston for pivotally attaching said linkage to said piston.

* * * * *

UNITED STATES PATENT AND TRADEMARK OFFICE
CERTIFICATE OF CORRECTION

PATENT NO. : 5,309,819
DATED : May 10, 1994
INVENTOR(S) : David F. Ford

It is certified that error appears in the above-indentified patent and that said Letters Patent is hereby corrected as shown below:

Col. 3, line 42 , after "drive assembly 52." insert — With reference to FIGS. 1 and 2, the brewing component 36 is shown as a piston 36 which will be referred to as such hereinafter. —

Signed and Sealed this

Eleventh Day of October, 1994

Attest:

BRUCE LEHMAN

Attesting Officer

Commissioner of Patents and Trademarks